United States Patent [19]

Pratt, Sr.

[11] Patent Number: 4,561,331
[45] Date of Patent: Dec. 31, 1985

[54] WHEEL RIM WRENCH

[76] Inventor: Russell W. Pratt, Sr., 236 E. Whitley St., Churubusco, Ind. 46723

[21] Appl. No.: 637,142

[22] Filed: Aug. 2, 1984

[51] Int. Cl.[4] .................... B25B 21/02; B25B 17/00
[52] U.S. Cl. ................................... 81/464; 81/466; 81/56; 81/57.31
[58] Field of Search ............... 81/55, 56, 57.11, 57.14, 81/57.3, 57.31, 463–466; 173/93–93.7, 48

[56] References Cited

U.S. PATENT DOCUMENTS

| | | |
|---|---|---|
| 2,313,398 | 3/1943 | Ronning . |
| 2,537,382 | 1/1951 | Valentin .................... 81/56 |
| 2,630,731 | 3/1953 | Imboden .................... 81/56 |
| 2,955,496 | 10/1960 | Torre . |
| 3,223,210 | 12/1965 | Schweizer .............. 173/93.6 X |
| 3,247,741 | 4/1966 | Batten . |
| 3,323,394 | 6/1967 | Bangerter et al. . |
| 3,323,395 | 6/1967 | Burnett et al. . |
| 3,331,269 | 7/1967 | Sauter .................... 81/57.31 |
| 3,369,615 | 2/1968 | Maffey, Jr. et al. .......... 173/93.6 |
| 3,392,608 | 7/1968 | Schanen et al. . |
| 3,584,527 | 6/1971 | Bosten . |
| 3,696,693 | 10/1972 | Bosten . |
| 3,916,734 | 11/1975 | Sawan . |
| 3,942,398 | 3/1976 | Fletcher et al. . |
| 4,289,049 | 9/1981 | Rebish . |
| 4,403,529 | 9/1983 | Ikeda et al. . |

FOREIGN PATENT DOCUMENTS

| | | |
|---|---|---|
| 447901 | 7/1944 | Canada . |
| 33320 | 10/1921 | Norway . |
| 569735 | 7/1943 | United Kingdom . |
| 750892 | 7/1952 | United Kingdom . |

Primary Examiner—Frederick R. Schmidt
Assistant Examiner—Debra S. Meislin
Attorney, Agent, or Firm—Albert L. Jeffers; Stephen T. Belsheim

[57] ABSTRACT

A tool for use in rotating a nut threadedly received on a mediately disposed threaded portion of an elongate connector having a contoured outside end and the tool simultaneously holding the connector stationary. The nut in conjunction with the connector are adapted to facilitate the retention of the outside wheel rim of a dual rim self-aligning wheel rim to a brake drum. The tool comprises a motor for providing rotational motion when in a selected condition. A wrench assembly for engaging the nut so that nut may be rotated. A drive assembly for connecting the motor to the wrench assembly so that the wrench assembly rotates the nut when engaged thereto and when the motor is in its selected condition. An axially stationary holding assembly for engaging the contoured end of the connector so as to hold the connector stationary during rotation of the nut. The holding assembly includes a socket portion that engages the contoured end. The socket portion is completely contained within the wrench assembly.

9 Claims, 14 Drawing Figures

WHEEL RIM WRENCH

BACKGROUND OF THE INVENTION

The invention relates to a tool such as a wrench, and more specifically, to a wrench that is used to remove a nut holding a wheel rim assembly to a brake drum.

There are many large tractor-trailer trucks which operate on the highways. It is estimated that about sixty to seventy percent of the tractor-trailer trucks use a so-called "Budd" wheel rim. The "Budd" wheel rim is a self-aligning wheel rim that is constructed so as to not require a great amount of expertise on the part of the person attaching the wheel rim to the truck wheel hub. This is an advantageous feature of the "Budd" type wheel rim when compared to a "spoke" type wheel rim.

Typically a pair of "Budd" type wheel rims are mounted to each wheel hub. This pair of "Budd" type wheel rims can be considered to be a dual self-aligning wheel rim. A plurality of hub studs pass from the interior of the brake drum through the wheel hub and brake drum housing so as to be projecting from the brake drum. An inner "Budd" type wheel rim is positioned so that the exposed portion of each stud passes through its corresponding aperture in the inner "Budd" rim. A cap stud is then threadedly connected to the hub stud so that the inner "Budd" type wheel rim is securely mounted to the wheel hub. An outer "Budd" type wheel rim is then oriented so that the exposed portion of each cap stud passes through its corresponding aperture in the outer wheel rim. A nut is then threaded onto the cap stud so as to securely mount the outer "Budd" type wheel rim to the hub.

As can be appreciated, the assembly for mounting the "Budd" type wheel rims to the hub is exposed to the elements during operation of the tractor-trailer truck. It is not unusual for a tractor-trailer truck to drive over one hundred thousand miles between tire changes. As a consequence of being subjected to a hostile environment for such a length of time, it is very common for the nut to be "frozen", as by corrosion or the like, to the cap stud. This occurrence presents special problems with the removal of the "Budd" type wheel rims from the hub.

When removing the nut from the cap stud, they must be held so that one is rotated with respect to the other. If this is not done, there is a great likelihood that the cap stud will be rotated so that the hub stud is backed out and falls into the brake drum. When this occurs, the entire wheel assembly must be dismantled. This results in a needless expenditure of both time and money by the tractor-trailer operator.

Heretofore, the "Budd" type wheel rims have been removed by utilizing a so-called "pork chop" tool in conjunction with a conventional impact wrench. The "pork chop" tool includes one end in which there is contained a contoured aperture that corresponds to the contour of the nut. This one end is positioned so that the nut is contained within the contoured aperture. The "pork chop" tool is then held stationary by the operator (e.g. by grasping it with his hand, stepping on it with his foot or by other means). The impact wrench is then fitted over the contoured outside end of the cap stud. The cap stud is then rotated relative to the nut. The "pork chop" is intended to hold the nut stationary.

The use of a "pork chop" tool in conjunction with an impact wrench has not always achieved the desired results since hub studs have been backed into the brake drum using such an arrangement. Even if the hub stud is not backed into the brake drum, the use of two separate tools on an object as big as a truck tire is both cumbersome and time consuming.

In view of the great number of tractor-trailers which operate and require regular maintenance in the form of changing of tires mounted on "Budd" type wheel rims, it should be appreciated that it would be highly desirable to provide a wheel rim wrench which can both efficiently and effectively remove "Budd" type wheel rims.

SUMMARY OF THE INVENTION

It is thus an object of the invention to provide an improved wheel rim wrench.

In one form thereof, the invention is a tool for use in rotating a nut threadedly received on a mediately disposed threaded portion of an elongate connector having a contoured outside end, and the tool simultaneously holding the connector stationary. The nut in conjunction with the connector are adapted to facilitate the retention to a brake drum of the outside wheel rim of a dual rim self-aligning wheel rim.

The tool comprises a motion means for providing rotational motion when the motion means is in a selected condition. The tool further includes a wrench means for engaging a nut so that the nut may be rotated. The tool also includes a drive means for connecting the motion means to the wrench means so that the wrench means rotates the nut when engaged thereto and when the motion means is in the selected condition.

Further, the tool includes an axially stationary holding means for engaging the contoured end of a connector so as to hold the connector stationary during rotation of the nut. The holding means includes a socket portion that engages the contoured end. The socket portion is completely contained within the wrench means.

In another form thereof, the invention is a power tool for loosening a nut from the mediately-disposed threaded portion of an elongate stud wherein the stud includes a contoured portion at one end thereof and a longitudinal bore opening at the other end thereof and the stud being mounted to a structure by a bolt passing through the structure and threadedly received within the bore of the stud. The power tool comprises a motor having a rotatable output shaft. A drive member has external gear teeth at one end thereof and a receiving bore opening at the other end thereof. The receiving bore receives the output shaft so that the drive member rotates upon rotation of the output shaft.

The power tool further includes an elongate holding member which has at one end thereof a socket for receiving the contoured portion of the stud. The other end of the holding member has mounted thereto a shell defining a chamber having a planetary gear assembly rotatably mounted to the shell. The drive member is received within the chamber so that the gear teeth of the drive member intermesh with the planetary gear assembly whereby the planetary gear assembly rotates upon rotation of the drive member.

The connector is receivable of the shell and it has a plurality of gear teeth formed therein. The connector gear teeth intermesh with the planetary gear assembly so that the connector rotates upon rotation of the planetary gear assembly.

The power tool further includes an elongate wrench member containing a bore therein. The wrench member is rotatably mounted at one end thereof to the connector and the socket is connected to the other end of the wrench member. The socket is receivable of the nut.

The power tool further includes an impact means which is connected to the connector and the wrench member. The impact means is used for operatively connecting the connector and wrench member so that the wrench member rotates upon rotation of the connector and also delivers sudden impact blows to the wrench member to overcome resistance of the nut from being rotated relative to the stud.

A portion of the holding member being positioned within the wrench bore so that the holding socket is contained within the bore and is spaced axially inwardly from the wrench socket so that when the wrench socket receives the nut the holding socket receives a contoured portion of the connector and the operation of the motor causes the wrench socket to rotate the nut relative to the connector while the connector is held stationary by the holding socket thereby preventing the connector from being unthreaded from the bolt.

In another form thereof, the invention is a power tool for rotating the nut that retains the outside rim of a two-rim self-aligning wheel rim wherein the nut is threadedly received on a mediately disposed threaded portion of an elongate stud contoured at its outside end. The power tool comprises a motor having a rotatable output shaft, and a drive assembly. Further, the power tool includes a wrench means, operatively connected to the motor by the drive assembly, for engagement of a nut so that upon operation of the motor the nut is rotated. An axially stationary holding means, contained within said wrench means, is used to engage the outside end of the stud so as to hold it stationary during rotation of the nut.

In another form thereof, the invention is a tool for rotating a nut threadedly received to exterior threads in a cap stud wherein the cap stud has a graspable head at one end and a flange at the other end. A threaded longitudinal bore opens at the other end of the cap stud. The outer wheel rim of a dual rim self-aligning wheel rim is retained between the nut and cap stud flange. The cap stud bore receives a threaded hub stud which extends from a brake drum so that the inner wheel rim of the dual rim self-aligning wheel rim is retained between the brake drum and the cap stud flange. The tool comprises a motor means for selectively generating the rotational motion to an output shaft. An elongate wrench has opposite ends with a socket at one of the ends wherein the wrench socket is receivable of the nut. A connector assembly is attached to the elongate wrench near the other of its opposite ends. The wrench contains a central longitudinal bore.

An elongate holding member has opposite ends with a holding socket at one end of the holding member. The holding socket is adapted to receive the graspable head of cap stud. An enlarged diameter housing is attached to the other end of the holding member. The holding housing contains a cavity which is defined by a sidewall wherein the sidewall contains a plurality of apertures. A planetary gear is rotatably received within each of the sidewall apertures. A driver has external gear teeth at one end thereof and a longitudinally internally splined bore opening at the other end thereof. The external driver gear teeth are received within the cavity so that the external driver gears engage the planetary gears.

A portion of the holding member is positioned within the bore of the elongate wrench. The connector assembly is operatively connected to the planetary gears. The internally splined bore is receivable of the output shaft so that rotational motion may be transferred to the driver from the output shaft, the driver transferring rotational motion to the planetary gears which, in turn, transfer rotational motion to the connector assembly which, in turn, transfers rotational motion to the elongate wrench so as to rotate the socket which, in turn, rotates the nut when the nut is engaged by the socket.

The above mentioned and other features and objects of the present invention, and the manner of attaining them, will become more apparent and the invention itself will be best understood by reference to the following description of an embodiment of the invention taken in conjunction with the accompanying drawings.

DETAILED DESCRIPTION OF A SPECIFIC EMBODIMENT

Figure 1:
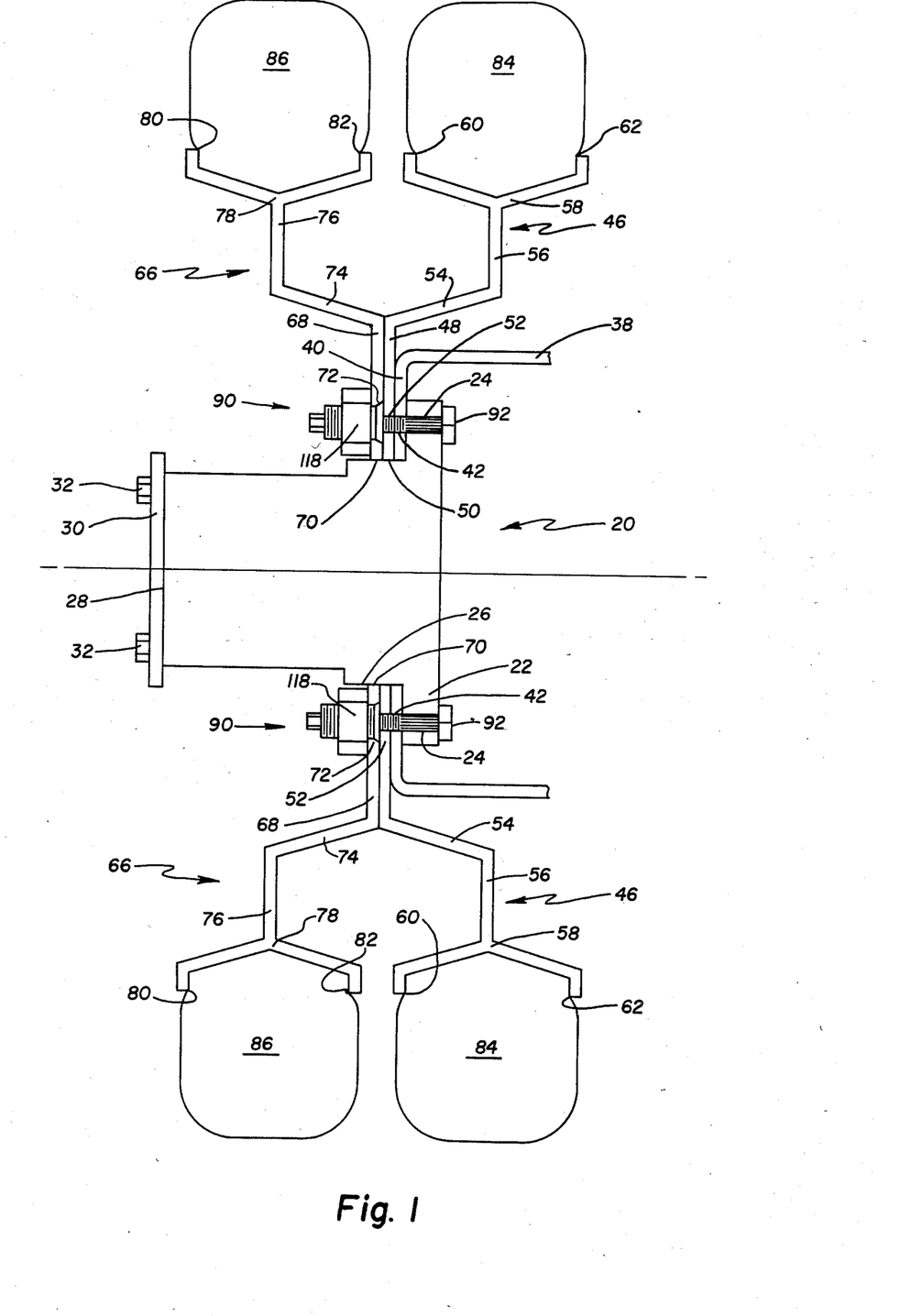
FIG. 1 is a mechanical schematic view of a dual rim self-aligning wheel rim (i.e. "Budd" type wheel rim) which is illustrated as being connected to a brake drum-wheel hub assembly.

Referring to FIG. 1, there is illustrated a wheel hub generally designated as 20. Wheel hub 20 includes a circumferential flange 22. Flange 22 contains therein a plurality of spaced apart apertures 24. Wheel hub 20 further includes a mediate circumferential surface 26. Wheel hub 20 has an open end 28 which is covered by a circular cover 30 secured to hub 20 by a plurality of bolts 32.

A brake drum 38 is attached to wheel hub 20. Brake drum 38 includes an integral depending flange 40 having a plurality of apertures 42 therein. Apertures 42 are spaced apart such that they correspond to apertures 24 contained in flange 22 of wheel hub 20.

There is illustrated in FIG. 1 an inner wheel rim 46 having a circular central portion 48. Central portion 48 contains a central aperture 50 of a diameter such that inner wheel rim 48 can fit over the mediate circumferential surface 26 of hub 20. Central portion 48 further includes a plurality of peripheral apertures 52 positioned radially outwardly of central aperture 50 and circumferentially spaced apart so as to correspond to apertures 24 in flange 22 and apertures 42 in brake drum 38. Inner wheel rim 46 further includes a longitudinally inwardly extending integral portion 54 as well as a radially outwardly extending peripheral integral portion 56. An integral forked portion 58 extends from peripheral portion 56. Forked portion 58 includes a pair of spaced-apart generally circular mounting points 60 and 62.

Outer wheel rim 66 includes a generally circular central portion 68. Central portion 68 contains therein a central aperture 70 which is of such a diameter so as to fit over mediate circumferential surface 26 of hub 20. Central portion 68 further includes a plurality of peripheral aperture 72 positioned radially outwardly of central aperture 70 and circumferentially spaced apart so as to correspond to previously mentioned apertures 24, 42 and 52. Outer wheel rim 66 includes a longitudinally outwardly extending integral portion 74. A radially outwardly extending peripheral integral portion 76 radially extends from portion 74. A forked integral portion 78 extends from peripheral portion 76 and includes a pair of spaced-apart circular mounting points 80 and 82. An inner tire 84 is mounted to inner wheel rim 46. An outer tire 86 is mounted to outer wheel rim 66.

Figure 2A:
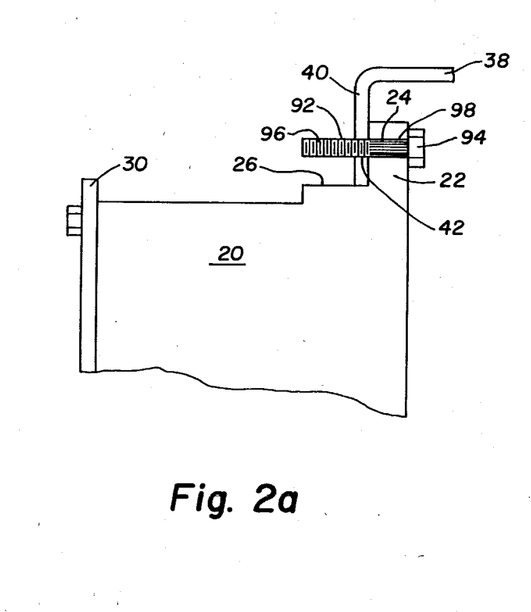
FIGS. 2A through 2C are side views that illustrate the steps which must be taken to assemble the "Budd" type wheel rims to the brake drum-wheel hub assembly of FIG. 1.
Figure 2B:
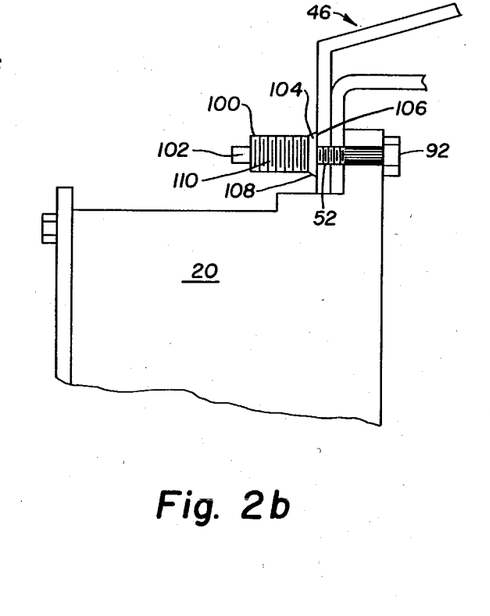
Figure 2C:
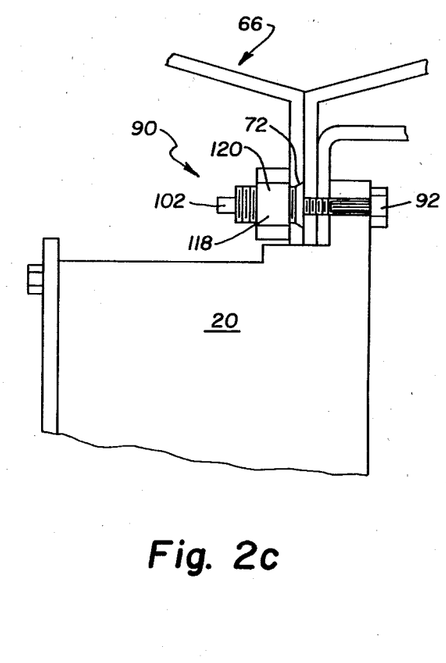

Referring to FIGS. 2A–2C, the rim mounting assembly is generally designated as 90. Rim mounting assembly includes an elongate hub stub 92 having a head 94 at one end, a splined portion 98 adjacent head 94 and a threaded portion 96. The following description will refer to only one hub stud and associated structure; however, it should be understood that a typical truck wheel hub has ten studs protruding therefrom and all of the mounting assemblies would have to be completely assembled to effectively attach the wheel rim to the wheel hub.

The hub stud 92 is positioned in its corresponding aperture 24 found in flange 22 and is held in position therein by splines found in splined portion 98. Hub stud 92 also passes through the aperture 42 found in the brake drum flange 40. The wheel hub and connected brake drum having the hub stud correctly positioned prior to mounting the wheel rims is illustrated in FIG. 2A.

The rim mounting assembly further includes an elongate cap stud 100 having a contoured head 102 at one end thereof and a flange 104 at the other end thereof. Flange 104 has an inner surface 106 and an outer surface 108. Cap stud 100 further contains threads 110 between flange 104 and head 102. Further, cap stud 100 contains a central bore 112 therein. Bore 112 is open adjacent flange 104. Central bore 112 is a threaded bore, and thus, includes threads 114.

Referring to FIG. 2B, it can be appreciated that the inner wheel rim 46 is positioned so that its peripheral apertures 52 line up with the protruding threaded portion of hub stud 92. Inner wheel rim 46 is then slid on to wheel hub 20 so that each hub stud 92 passes through its corresponding peripheral aperture 52. Once the inner wheel rim has been positioned as described above, the cap stud is positioned so that the threaded portion 96 of hub stud 42 engages the threads 114 found in central bore and cap stud 100 is threaded onto hub stud 92. The cap stud is threaded to such an extent that the inner wheel rim 46 is now securely mounted to the wheel hub 20.

Once the inner wheel rim has been connected to the hub, the hub is now ready to receive the outer wheel rim.

Outer wheel rim 66 is now aligned so that its peripheral apertures 72 line up with the protruding threaded portion of the corresponding cap studs 100. The outer wheel rim is now positioned so as to be slid onto wheel hub 20 wherein each cap stud 100 passes through its corresponding peripheral aperture 72. Once the outer wheel rim has been positioned as described above, the mounting nut 118, having an external surface 120 and a central bore 122 containing threads 124, is threaded onto threaded portion 110 of cap stud 100. In other words, threads 124 of nut 118 engage threads 110 of cap stud 100. The nut is threaded onto cap stud 100 to an extent such that both the inner and outer wheel rims are now securely mounted to the wheel hub.

It should be understood that during this assembly operation a tire is already mounted to each wheel rim. Thus the end result is a complete tractor-trailer dual wheel assembly as illustrated in FIGS. 1 and 2C. In FIG. 1 the tires are illustrated as mounted to their respective wheel rims. The wheel assembly is in this condition when the truck is operated over the highway. As can be appreciated, the connection between nut 118 and cap stud 100 is subjected to a hostile environment over a rather extended period of time. As previously mentioned, it is a common occurrence for nut 118 to be "frozen" to cap stud 100 as by corrosion or the like.

Figure 4:
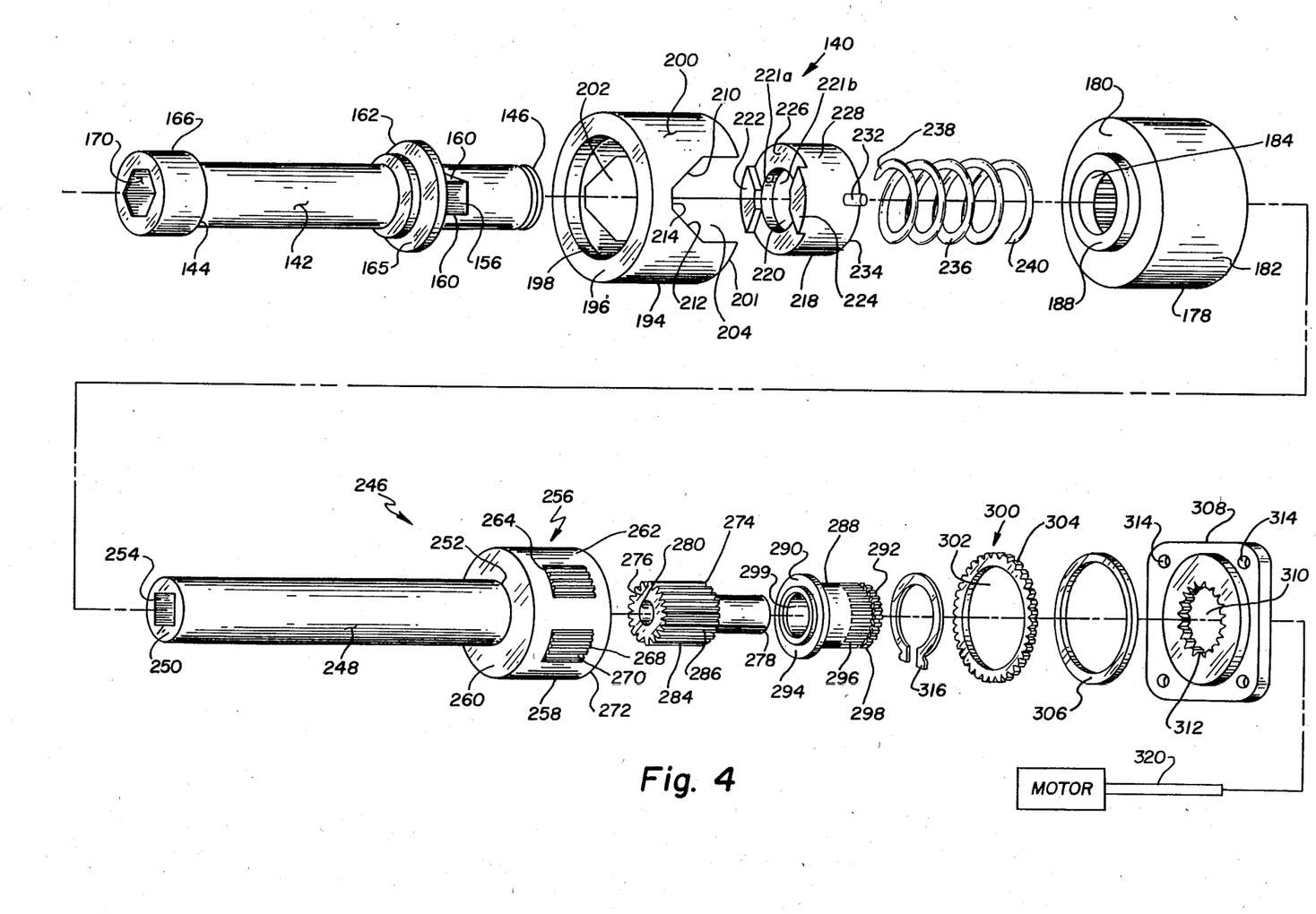
FIG. 4 is an exploded perspective view of a specific embodiment of the wheel rim wrench of the invention.
Figure 5:
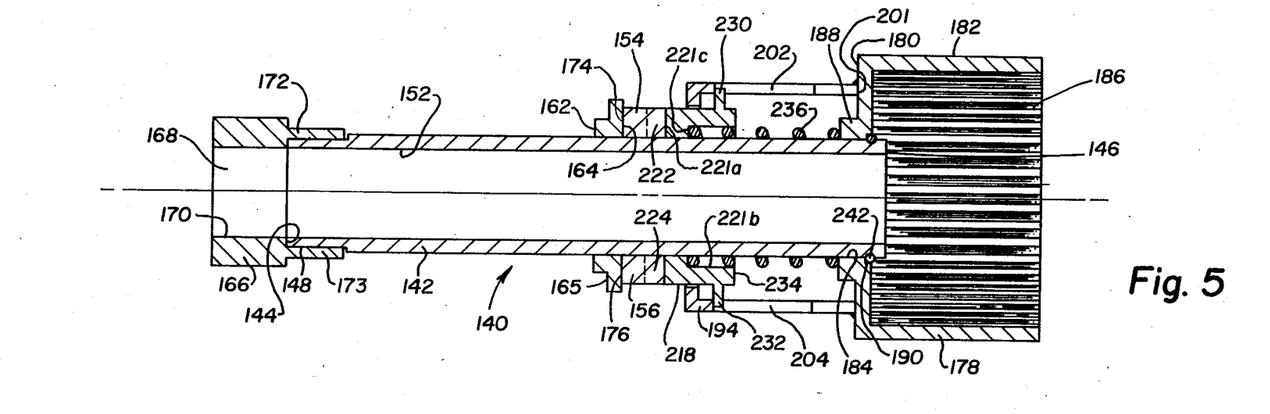
FIG. 5 is a cross-sectional view taken along a centrally disposed section line of FIG. 4 illustrating the first assembly portion of the wheel rim wrench in an assembled condition.

Referring now to FIGS. 4 and 5, there is illustrated a specific embodiment of the wheel rim wrench of the invention which is generally designated as 130. Wheel rim wrench 130 includes a first wrench assembly generally designated as 140. First wrench assembly 140 includes an elongate wrench element 142 having opposite ends 144 and 146. Wrench element 142 contains a plurality of splines 148 adjacent one end 144 thereof. Wrench element 142 further contains therein an annular channel 150 adjacent other end 146 thereof. Elongate wrench element 142 further contains therein a generally central longitudinal smooth bore 152. Bore 152 passes completely through wrench element 142.

A pair of oppositely disposed anvils 154 and 156 are attached to the circumferential surface of wrench element 142. Anvils 154, 156 are spaced in an axially outward direction from end 146 of element 142. Anvils 154 and 156 each contain impact surfaces 158 and 160, respectively. Further, each anvil 154 and 156 has a bottom surface 174 and 176, respectively. An annular collar 162 having an inner surface 164 is attached to the exterior circumferential surface of wrench element 142. Collar 162 is positioned so that the inner surface 164 thereof abuts against the bottom surfaces 174 and 176 of anvils 154 and 156, respectively. Collar 162 further includes an outer surface 165.

Figure 8:
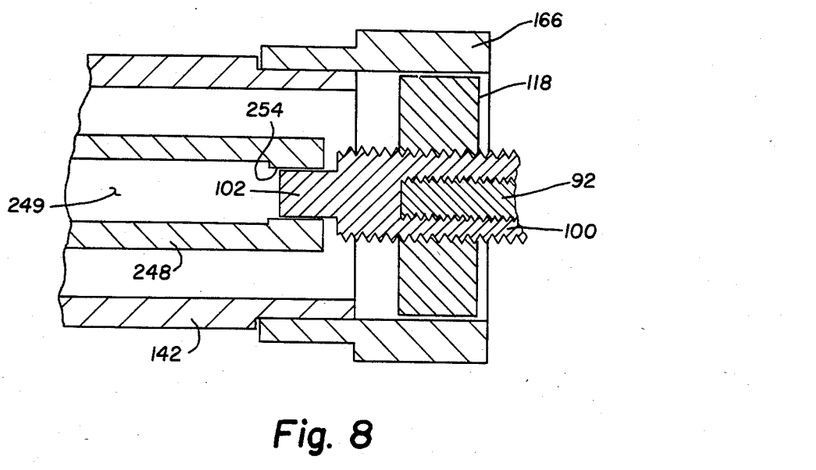
FIG. 8 is a mechanical schematic view illustrating the fashion in which the wheel rim wrench grasps the cap stub nut and contoured end of the cap stub.

A socket element 166 is attached to wrench element 142 at end 144 thereof. Socket element 166 includes a central bore 168 having a contoured portion 170 and a splined portion 172. The contoured portion 170 is shaped and sized so as to engage the nut 118. This is illustrated in FIG. 8. The splined portion 172 includes a plurality of splines 173 which correspond to splines 148 contained in wrench element 142 so that socket element 166 attaches to wrench element 142 via their respective splines. As can be appreciated, socket element 166 is detachably connected to wrench element 142 via splines 148 and 173. Although it is typical that all "Budd" type wheel rims utilize nuts 118 of the same size and configuration, it can be appreciated that one can use socket elements 166 of different sizes and configurations so that the wheel rim wrench 130 can accommodate nuts of a variety of shapes and sizes.

The first wrench assembly further includes a generally annular-shaped container 178 having a circular face 180 and an integral cylindrical upstanding sidewall 182. Circular face 180 contains therein a circular aperture 184. A plurality of gear teeth 186 are formed in the interior surface of cylindrical sidewall 182. An annular integral collar 188 extends in an axially outward direction from circular face 180 and surrounds aperture 184. The interior surface of integral collar 188 and the portion of circular face 180 adjacent thereto contain an annular channel 190 therein.

First wrench assembly 140 further includes a generally annular shaped hammer retainer 194 having a circular face 196 in which is contained an aperture 198. Hammer retainer 194 further includes a generally cylindrical sidewall 200 having a pair of oppositely disposed contoured notches 202 and 204 cut therein. Each notch is of the same general configuration so that a description of notch 202 will suffice for further description of the remaining notch 204. Contoured notch 202 includes a pair of oppositely disposed inclined portions 210 and 212. Inclined portions 210 and 212 are continuous with and joined by a level and/or neutral portion 214. The unconnected ends of inclined portions 210 and 212 each have an integral terminating portion extending therefrom which has a surface that is generally perpendicularly disposed to the surface of level portion 214. Inclined portions 210 and 212 as well as level portion 214 all have a smooth sliding surface over which a projection or the like may ride.

First wrench assembly 140 further includes a generally annular hammer 218 having a central bore 220. Central bore 220 has a reduced diameter portion 221a and an enlarged diameter portion 221b. A shoulder 221c joins the reduced and enlarged diameter portions of bore 220.

A pair of depending integral hammer elements 222 and 224 extend out of the forward face 226 of hammer 218. Hammer 218 further includes a sidewall 228. A pair of oppositely disposed pins 230 and 232 project from sidewall 228. Pins 230 and 232 are disposed adjacent to the rear annular face 234 of hammer 218. First wrench assembly 140 further includes an elongate coil spring 236 having opposite ends 238 and 240.

Referring now to FIG. 5, the first wrench assembly 140 is shown therein in an assembled condition. Hammer retainer 194 is attached, as by welding or the like, at its rear circumferential surface 201 to retainer 178 at its circular face 180 thereof. Hammer 218 is contained between hammer retainer 194 and retainer 178 by pins 230 and 232 which engage the sliding surfaces of the contoured notches found in hammer retainer 194. Spring 236 is sandwiched between shoulder 221c of hammer 218 and the annular collar 188 that protrudes from the circular face 180 of retainer 178.

A portion of elongate wrench element 142 that is axially inward of inner surface 164 of collar 162 passes through aperture 198 of hammer retainer 194, central bore 220 of hammer 218, and the central longitudinal volume contained within spring 236. Wrench element 142 is positioned relative to retainer 178 so that end 146 is contained within the volume of retainer 178 and is positioned relative thereto so that channels 150 (of elongate wrench element 142) and channel 190 (of retainer 178) together form a race. Channel 150 and channel 190 are dimensioned so that a bearing means, such as a plurality of ball bearings 242, is contained within this race.

In order to properly position bearings 242 within the race, wrench element 142 is positioned so that channel 150 is axially inward of channel 190. Bearing 242 are placed within channel 150 and the wrench element 142 is allowed to slide axially outward under the influence of spring 236 to the position illustrated in FIG. 4.

It can now be appreciated that the first wrench assembly 140 is a separate sub-assembly of the entire wheel rim wrench 130. It can also be appreciated that spring 236 exerts a longitudinally outwardly biasing force against hammer 218 which biases hammer 218 against collar 162 so that hammer elements 222 and 224 ride on inner surface 164. Further, hammer 218 is biased against collar 162 resulting in an axially outwardly biasing force being exerted on elongate wrench element 142. Elongate wrench element 142 is prevented from further outwardly axial movement by bearings 242.

Figure 6:
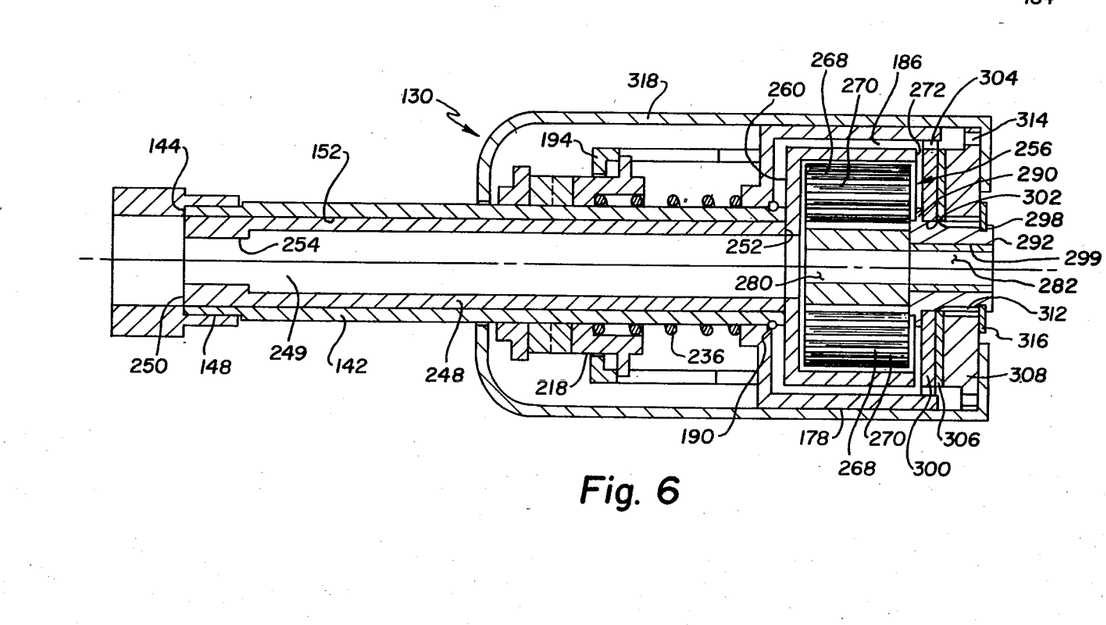
FIG. 6 is a cross-sectional view of the wheel rim wrench of FIG. 4 taken along a centrally disposed section line illustrating the complete wheel rim wrench in an assembled condition and having a housing.

Referring now to FIGS. 4 and 6, wheel rim wrench 130 further includes an elongate holding member 246. Holding member 246 includes an elongate shaft 248 having opposite ends 250 and 252. Elongate shaft 248 contains a central bore 249. A socket 254 is formed within shaft 248 adjacent end 250 thereof. Socket 254 is of a size and dimension so as to adequately and tightly engage the head 102 of cap stud 100. This is illustrated in FIG. 8. Again, it is typical that the "Budd" type wheel rim utilizes a cap stud having a head of a uniform dimension and contour. However, it is certainly contemplated by applicant's invention to provide a holding member 246 which can accommodate one of a plurality of sockets of different sizes and contours. Although not illustrated, this can be accomplished by utilizing a complimentary spline-type connection as utilized with wrench element 142 and socket element 166 described above. As will become apparent from the description hereinafter, the external dimensions of such a detachable socket would have to be such so that the shaft 248 of holding member 246 can be positioned within bore 152 of wrench element 142.

A planetary gear assembly generally designated as 256 is attached to the other end 252 of shaft 248. Planetary gear assembly 256 includes a generally annular planetary gear holder 258. Holder 258 includes forward face 260 and an integral cylindrical sidewall 262. Sidewall 262 has contained therein a plurality of equi-spaced generally rectangularly-shaped apertures 264. Further, a cavity 266 is found within planetary gear holder 258. Planetary gear assembly 256 further includes a plurality of planetary gears 268 each having gear teeth 270. Each single planetary gear 268 is rotatably mounted within its corresponding aperture 264.

Figure 7:
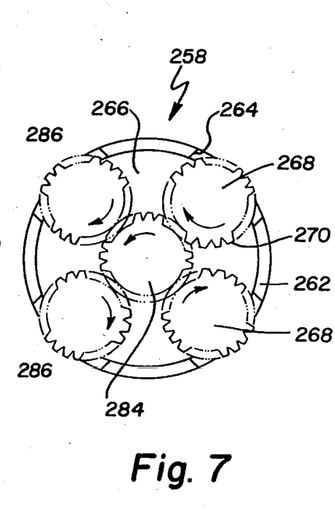
FIG. 7 is a cross-sectional view illustrating the intermeshing of the sun gear and planetary gear.

Wheel rim wrench 130 further includes a drive member 274 having opposite ends 276 and 278. Drive member 274 has a longitudinal bore 280 contained therein. Bore 280 has contained therein a plurality of splines 282 which are adjacent end 278. An enlarged diameter drive gear 284 is contained at end 276 of drive member 274. Drive gear 284 has gear teeth 286. As can be appreciated from FIGS. 6 and 7, drive member 274 is positioned within cavity 266 of planetary gear holder 258 so that gear teeth 286 engage the gear teeth 270 of all the planetary gears 268. It can thus be appreciated that the rotation of drive member 274 will result in the rotation of planetary gears 268. Shaft 248 remains stationary during the rotation of planetary gears 268.

The wheel rim wrench further includes an annular retainer 288 having opposite ends 290 and 292. An annular front flange 294 is found near end 290 and a plurality of exterior gear teeth 296 are found at end 292. A circumferential channel 298 is further contained within annular retainer 288 adjacent end 292 thereof. Annular retainer 288 further includes a central longitudinal bore 299. As can also be appreciated by viewing FIG. 6, at least a portion of annular retainer 288 is positioned within cavity 266. The outwardly facing surface of flange 294 is adjacent the inward edge of gear teeth 286.

Shaft 248 of holding member 246 is positioned so as to pass through aperture 184 of retainer 178, the central portion of spring 236, central bore 220 of hammer 218, aperture 198 found in the circular face of hammer retainer 194, and into bore 152 of elongate wrench element 142. Shaft 248 extends to the extent that socket 254 is completely contained within bore 152. Further, socket 254 is spaced at a preselected distance inwardly of socket element 166. The distance that socket 254 is spaced inwardly of socket 166 is such so as to accommodate the dimensioning found in the typical "Budd" type wheel rim assembly. As can be appreciated, this dimensioning can be varied to accommodate various wheel rim arrangements.

Once holding member 246 is positioned as described above, a ring gear 300, having an aperture 302 and a plurality of circumferential teeth 304, is positioned so as to be near the annular rear surface 272 of planetary gear holder 258. Flange 294 spaces ring gear 300 apart from surface 272. Ring gear 300 is also contained within the internal cavity defined by retainer 178. The circumferential teeth 304 of ring gear 300 engage gear teeth 186 of retainer of 178.

A ring spacer 306 is positioned so as to abut the inward surface of ring gear 300. Further, the wheel rim wrench includes an end plate 308 having a central aperture 310 with radially inwardly extending teeth 312 at the periphery of aperture 310. End plate 308 further includes a plurality of mounting holes 314 with each hole found adjacent to a corner of end plate 308. End plate 308 is positioned so as to slide over annular retainer 288 whereby teeth 312 engage gear teeth 296. A snap ring 316 fits within channel 298 so that the entire assembly is now retained together.

As illustrated in FIG. 5, there is an elongate housing 318 which extends from the outside surface of collar 162 back to the end plate 308. The housing 318 includes threaded apertures which receive screws 322 which pass through mounting holes 314 so as to securely mount housing to the interior assembly. The housing can be of a two-piece type wherein the pieces are positioned about the interior assembly and then connected together.

It should be mentioned that drive member 274 is operatively connected at splines 282 to a source of rotary motion such as the output shaft 320 of an air motor. Although an air motor is contemplated, it should be understood that other sources of rotary motion with a rotating output shaft could suffice.

Referring to FIGS. 6 and 8, there is in FIG. 8 shown the positioning of the wheel rim wrench on a cap stud and nut of a "Budd" type wheel rim (a self-aligning type wheel rim) where both wheel rims are securely mounted to the wheel hub. The contoured portion 170 of socket element 166 fits over nut 118. Nut 118 is securely threaded to cap stud 100. Socket 254 securely fits over head 102 of cap stud 100. Holding member 246 does not move in a axial direction so that cap stud 100 is held by an axially stationary member. The wheel rim wrench is now ready to operate.

Upon operation of the air motor the output shaft rotates which, in turn, rotates drive member 274 since the output shaft of the rotary power source and the drive member are coupled together. Drive member 274 rotates in bore 299 of annular retainer 288. Rotation of drive member 274, in turn, causes the planetary gears 268 to rotate since gears 284 intermesh with planetary gears 268. As can be appreciated, annular retainer 288, ring gear 300, spacer 302, and end plate 308 all remain stationary.

As previously mentioned, during the rotation of planetary gears 268, shaft 248 remains stationary. Thus, as can be appreciated from the view illustrated illustrated in FIG. 8, the cap stud is securely held by socket 254 so that the cap stud will remain stationary throughout the entire operation of the wrench.

As previously mentioned, the gear teeth 270 of the planetary gears 268 engage gear teeth 186 found in retainer 178. Thus, upon the rotation of the planetary gears, which occurs when the air motor is energized, retainer 178 rotates along with the hammer retainer 194 since hammer retainer 194 is securely attached (e.g. welding) to retainer 178.

As previously described, the axially outward force exerted against hammer 218 by spring 236 maintains hammer 218 against hammer retainer 194 so that retainer 194 carries hammer 218. Thus, in the situation where the nut is not frozen onto the cap stud, the hammer 218 rotates along with the hammer retainer. When hammer 218 rotates its depending hammer elements 222 and 224 engage their corresponding anvils 154 and 156 so as to cause elongate wrench element 142 to also rotate. As illustrated in FIG. 8, the socket element 166 of wrench element 142 receives nut 118 so that the rotation of elongate wrench element 142 results in the rotation of nut 118 relative to cap stud 100. As previously mentioned, cap stud 100 is held stationary by socket 254 found in shaft 248.

It can thus now be appreciated that the cap stud is held stationary by holding member 246 while the nut is rotated by wrench element 142. Depending upon the direction of rotation, nut 118 may be either threaded off cap stud 100 during a disassembly operation or threaded onto cap stud 100 during an assembly operation.

Figure 3:
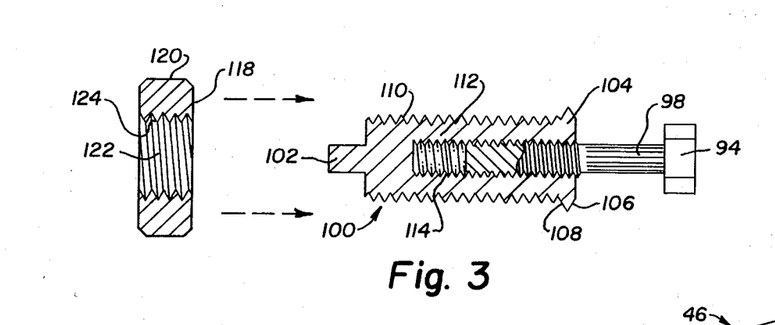
FIG. 3 is a cross-sectional view of the assembly that mounts the wheel rims to the wheel comprising a hub stud, stud and nut.

As previously mentioned, oftentimes after long periods of use in a generally hostile environment, nut 118 is frozen onto the threaded portion of cap stud 100. It is thus sometimes necessary to suddenly impact nut 118 so as to break it loose from cap stud 100. Applicant has provided an impact feature to his wheel rim wrench. The operation of that impact feature is described below with specific reference to FIGS. 9A through 9D as well as FIG. 3.

Figure 9A:
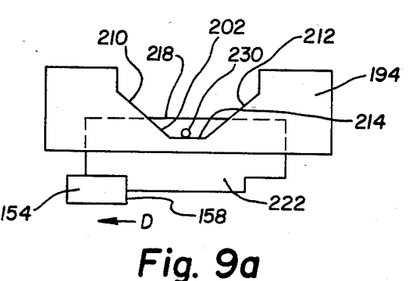
FIGS. 9A through 9D are mechanical schematic side views that illustrate the operation of the impact feature of the specific embodiment of FIG. 4.
Figure 9B:
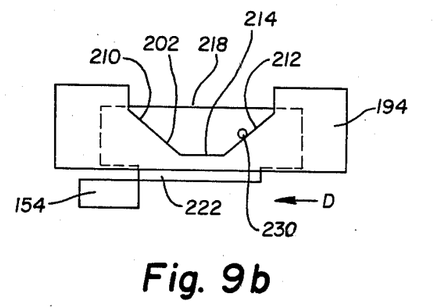

Referring to the above-mentioned figures, FIG. 9A is a mechanical schematic view illustrating one side of the impact feature structure. Although only one side is illustrated and described, it should be understood that the corresponding action will occur with regard to the other side of the hammer. FIG. 9A illustrates hammer 218 in a position in which the depending hammer element 222 abuts so as to fully engage its respective anvils 154. Although not illustrated, hammer element 224 abuts its corresponding anvil 156. In the position illustrated in FIG. 9A, the operation of the air motor such that the direction of rotation is in the direction of arrow "D", will cause the elongate wrench element 142 (and, of course, socket element 166) to rotate in that direction "D".

In a situation where nut 118 is frozen on cap stud 100, nut 118 may be very difficult to initially remove. In a situation in which nut 118 does not initially rotate, the continued application of rotational force upon hammer retainer 194 causes hammer retainer 194 to rotate relative to hammer 218. This results in the inclined portion of 212 of contoured notch 202 acting upon pin 232 so as to move the hammer 218 in an axially inward direction (see FIG. 9B) against the spring force of spring 236. It can thus be appreciated that the resistance provided by nut 118 must be sufficient so as to overcome the force exerted upon pin 230 by spring 236.

Figure 9C:
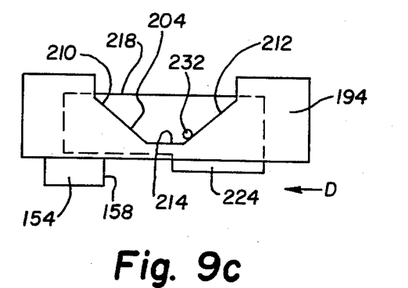
Figure 9D:
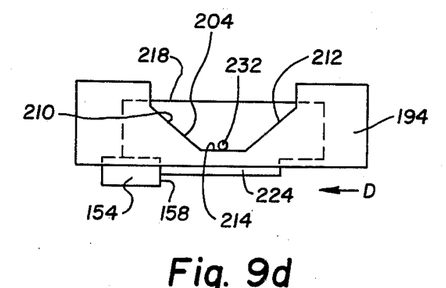

As nut 118 continues to provide resistance in excess of the spring force, hammer retainer 194 continues to rotate relative to hammer 218 so that hammer 218 rises to a certain point on the inclined portion 212 where hammer element 222 no longer abuts anvil 154. At this point, hammer element 224 also no longer abuts anvil 156. There now exists no resistance to the rotation of hammer retainer 194 so that it quickly increases its speed of rotation. At the same time, the spring 236 exerts an axially outward biasing force on hammer 218 so as to drive it to its so-called neutral position. FIG. 9C illustrates hammer 218 being driven to the neutral position with the hammer element 224 yet not in abutment with anvil 154. FIG. 9D illustrates hammer element 224 impacting upon anvil 154 so as to exert a sudden impact on elongate wrench element 142 which, in turn, exerts the same impact upon socket element 166 translating it to nut 118 until nut 118. Even though not illustrated, it should be understood that at the same time hammer element 222 impacts on anvil 156.

If nut 118 continues to exhibit this initial resistance, the cooperation between hammer retainer 194 and hammer 218 continues whereby successive impacts are exerted upon the anvils which translate to successive sudden impacts being exerted upon nut 118 is broken loose from the cap stud. It can thus be appreciated that applicant's wheel rim wrench includes an impact feature which can prove to be very useful when loosening nuts which are frozen onto the cap stud.

While there have been described above the principles of this invention in connection with specific apparatus, it is to be clearly understood that this description is made only by way of example and not as a limitation to the scope of the invention.

What is claimed is:

1. A tool for use in rotating a nut threadedly received on a mediately disposed threaded portion of an elongate connector having a contoured outside end and simultaneously holding the connector stationary, wherein the nut in conjunction with the connector are adapted to facilitate the retention to a brake drum of an outside wheel rim of a dual rim self-aligning wheel rim, the tool comprising:

a motion means for providing rotational motion at an output element thereof when said motion means is in a selected condition;

a wrench means for engaging the nut so that the nut may be rotated;

a drive for connecting the output element of said motion means to said wrench means so that said wrench means rotates the nut when engaged thereto and when said motion means is in the selected condition, said drive means includes a drive member having opposite ends, external gear teeth formed in said drive member adjacent one of said ends, and a receiving bore opening at the other of said ends so as to be receivable of said output element;

an axially stationary holding means for engaging the contoured end of the connector so as to hold the connector stationary during rotation of the nut, said holding means including a socket portion that engages the contoured end, and said socket portion being completely contained within said wrench means, said holding means further includes a solid elongate holder member having opposite ends, said socket portion being at one end of said holder member;

a planetary gear means, at the other end of said elongate member, for operatively connecting said drive member to said connection assembly so that said wrench means rotates upon the rotation of said drive member, said planetary gear means includes a cylindrical gear housing, and a plurality of circumferentially-spaced planetary gears rotatably mounted to said cylindrical gear housing, and a connection assembly connected to said wrench means, said connection assembly includes a hollow connector housing containing a plurality of gear teeth in the interior surface thereof, said planetary gear means being received within said connector housing so that said planetary gears engage said interior gear teeth whereby said connector housing rotates upon the rotation of said planetary gears, and a hammer-anvil assembly operatively connected to said wrench means and to said hollow connector housing so that said wrench means rotates upon the rotation of said connector housing.

2. The tool of claim 1 wherein said wrench means includes an elongate wrench member having opposite ends, a wrench socket at one of said ends, said wrench socket being adapted to receive the nut, and said gear housing being secured to the other end of said wrench member.

3. The tool of claim 2 wherein said wrench member contains a generally longitudinal bore therein, a portion of said holder member adjacent said holder socket being contained within said longitudinal bore, said holder socket being spaced axially inward of said wrench socket so that said holder socket receives the contoured end of the connector and the wrench socket receives the nut.

4. The tool of claim 2 wherein said hammer-anvil assembly includes a hammer having a plurality of projecting hammer elements, a plurality of pins extending from said hammer, a hammer retainer mounted to said connector housing, said hammer retainer including notches that slidably receive said pins, a plurality of anvils secured to said wrench member so as to be engagable by said hammer elements, and a spring positioned between said hammer and said connector housing so as to continuously exert an axially outward biasing force against said hammer.

5. The tool of claim 4 wherein each of said notches includes an inclined portion wherein upon said wrench member encountering resistance to the rotation of the nut greater than a preselected amount said hammer retainer rotates relative to said hammer so that said inclined portion acts on its corresponding said pin to urge said hammer in an axially inward direction against the bias of said spring.

6. A power tool for loosening a nut from the mediately-disposed threaded portion of an elongate stud wherein the stud includes a contoured portion at one end thereof and a longitudinal bore opening at the other end thereof, and the stud being mounted to a structure by a bolt passing through the structure and threadedly received within the bore of the stud, the power tool comprising:

a motor having a rotatable output shaft;

a drive member having external gear teeth at one end thereof and a receiving bore opening at the other end thereof, said receiving bore receiving said output shaft so that said drive member rotates upon the rotation of said output shaft;

an elongate holding member having at one end thereof a socket for receiving the contoured portion of the stud and the other end thereof having mounted thereto a shell defining a chamber having a planetary gear assembly rotatably mounted to said shell, said drive member being received within said chamber so that said gear teeth of said drive member intermesh with said planetary gear assembly whereby said planetary gear assembly rotates upon the rotation of said drive member;

a connector receivable of said shell and having a plurality of gear teeth formed therein, said connector gear teeth intermeshing with said planetary gear assembly so that said connector rotates upon rotation of said planetary gear assembly;

an elongate wrench member containing a bore therein, said wrench member being rotatably mounted at one end thereof to said connector, a socket connected to the other end of said wrench member, said socket receivable of the nut;

an impact and connecting means, connected to said connector and said wrench member, for operatively connecting the connector and the wrench member so that the wrench member rotates upon rotation of the connector and for delivering sudden impact blows to said wrench member to overcome resistance of the nut from being rotated relative to the stud; and a portion of said holding member positioned within said wrench bore so that said holding socket is contained within said bore and is spaced axially inwardly from said wrench socket so that when said wrench socket receives the nut said holding socket receives the contoured portion of the connector and the operation of said motor causes said wrench socket to rotate the nut relative to the connector while the connector is held stationary by said holding socket thereby preventing the connector from being unthreaded from the bolt.

7. The power tool of claim 6 wherein said impact means includes:

a hammer having a projecting hammer element, a pin extending from said hammer;

a hammer retainer mounted to said connector, said hammer retainer containing a notch therein that slidably receives said pin;

an anvil secured to said wrench member so as to be engagable by said hammer element; and a spring positioned between said hammer and said connector so as to continuously exert an axially outward biasing force against said hammer.

8. The power tool of claim 7 wherein said notch includes an inclined portion that acts on said point to urge said hammer in an axially inward direction when the nut offers an initial resistance to rotation relative to the stud that is greater than a preselected amount.

9. The power tool of claim 8 wherein the preselected amount of initial resistance is directly proportional to the spring force constant of said spring.

* * * * *

UNITED STATES PATENT AND TRADEMARK OFFICE
CERTIFICATE OF CORRECTION

PATENT NO. : 4,561,331

DATED : December 31, 1985

INVENTOR(S) : Russell W. Pratt, Sr.

It is certified that error appears in the above-identified patent and that said Letters Patent is hereby corrected as shown below:

Claim 1, column 11, line 66, insert --means-- after "drive".

Signed and Sealed this

Twenty-seventh Day of May 1986

[SEAL]

Attest:

DONALD J. QUIGG

Attesting Officer

Commissioner of Patents and Trademarks